United States Patent
Wilson et al.

(10) Patent No.: US 10,460,165 B2
(45) Date of Patent: Oct. 29, 2019

(54) HEAD MOUNTED DISPLAY

(71) Applicant: FOVE, Inc., San Mateo, CA (US)

(72) Inventors: Lochlainn Wilson, Tokyo (JP); Keiichi Seko, Tokyo (JP)

(73) Assignee: FOVE, Inc., Tokyo (JP)

(\*) Notice: Subject to any disclaimer, the term of this patent is extended or adjusted under 35 U.S.C. 154(b) by 374 days.

(21) Appl. No.: 15/028,838

(22) PCT Filed: Apr. 1, 2015

(86) PCT No.: PCT/JP2015/060397
§ 371 (c)(1),
(2) Date: Apr. 12, 2016

(87) PCT Pub. No.: WO2016/157485
PCT Pub. Date: Oct. 6, 2016

(65) Prior Publication Data
US 2017/0262703 A1 Sep. 14, 2017

(51) Int. Cl.
*H04N 5/225* (2006.01)
*G06F 3/03* (2006.01)
(Continued)

(52) U.S. Cl.
CPC ....... *G06K 9/00604* (2013.01); *G02B 27/017* (2013.01); *G02B 27/02* (2013.01);
(Continued)

(58) Field of Classification Search
CPC .................................. G06K 9/00604
See application file for complete search history.

(56) References Cited

U.S. PATENT DOCUMENTS 5,220,361 A \* 6/1993 Lehmer ................ A61B 3/024
351/226
6,204,974 B1 \* 3/2001 Spitzer ................ G02B 27/017
359/630
(Continued)

FOREIGN PATENT DOCUMENTS

JP    02-264632    10/1990
JP    06-509486    10/1994
(Continued)

OTHER PUBLICATIONS

Notice of Reasons for Refusal dated May 31, 2016, of corresponding Japanese Application No. 2015-558247 with an English translation.
(Continued)

*Primary Examiner* — Jayanti K Patel
*Assistant Examiner* — Irfan Habib
(74) *Attorney, Agent, or Firm* — DLA Piper LLP (US)

(57) ABSTRACT

A head mounted display includes a lens disposed at a position facing a user's cornea; a plurality of infrared light sources disposed in a periphery of the lens that emit infrared light toward the user's cornea; a hot mirror that reflects the infrared light; a camera that captures an image projected into the hot mirror; an output unit that outputs an image captured by the camera to an eyesight direction detection unit that detects an eyesight direction of the user; and a housing, wherein when the periphery of the lens is divided into four regions: a first corresponding to the outer corner side of the eye, a second corresponding to the inner corner side, a third corresponding to the top side of the head, and a fourth corresponding to the jaw side, the plurality of infrared light sources are disposed in any of the first region and the second region.

3 Claims, 10 Drawing Sheets

(51) Int. Cl.
*G06K 9/00* (2006.01)
*G02B 27/02* (2006.01)
*H04N 5/33* (2006.01)
*G02B 27/01* (2006.01)
*G06F 3/01* (2006.01)

(52) U.S. Cl.
CPC ......... *G06F 3/0304* (2013.01); *G06K 9/0061* (2013.01); *H04N 5/2252* (2013.01); *H04N 5/33* (2013.01); *G02B 2027/0138* (2013.01); *G02B 2027/0187* (2013.01); *G06F 3/013* (2013.01)

(56) References Cited

U.S. PATENT DOCUMENTS

| | | | | |
|---|---|---|---|---|
| 6,353,503 | B1* | 3/2002 | Spitzer | G02B 27/017 |
| | | | | 359/630 |
| 6,426,740 | B1* | 7/2002 | Goto | A61F 4/00 |
| | | | | 345/157 |
| 7,717,561 | B2* | 5/2010 | Knaan | A61B 3/113 |
| | | | | 351/206 |
| 8,337,015 | B2* | 12/2012 | Sugihara | G02B 27/0172 |
| | | | | 345/7 |
| 9,028,068 | B2* | 5/2015 | Chang | G02C 11/00 |
| | | | | 351/209 |
| 9,092,671 | B2* | 7/2015 | Noda | A61B 5/1171 |
| 9,613,506 | B2* | 4/2017 | Moussette | H04N 21/4307 |
| 9,625,989 | B2* | 4/2017 | Wilson | G06T 7/215 |
| 9,684,374 | B2* | 6/2017 | Starner | G06F 3/013 |
| 2014/0160157 | A1* | 6/2014 | Poulos | G06F 3/011 |
| | | | | 345/633 |
| 2014/0354514 | A1* | 12/2014 | Aronsson | G06F 3/013 |
| | | | | 345/7 |

FOREIGN PATENT DOCUMENTS

| | | |
|---|---|---|
| JP | 09-179062 | 7/1997 |
| JP | 11-73274 | 3/1999 |
| JP | 2013-187794 | 9/2003 |
| JP | 2004-233425 | 8/2004 |
| JP | 2008-241822 | 10/2008 |
| WO | 2014/209819 | 12/2014 |
| WO | 2015/012280 | 1/2015 |

OTHER PUBLICATIONS

Notice of Reasons for Refusal dated Aug. 30, 2016, of corresponding Japanese Application No. 2015-558247 with an English translation.

Notice of Grounds for Rejection dated Dec. 1, 2017, of counterpart Korean Application No. 10-2016-7036204, along with an English translation.

* cited by examiner

HEAD MOUNTED DISPLAY

TECHNICAL FIELD

This disclosure relates to a head mounted display.

BACKGROUND

A technique is known in which the eyesight direction of a user is detected by emitting non-visible light such as near-infrared light to the user's eyes and analyzing an image of the user's eyes including reflected light. Information of the detected eyesight direction of the user is reflected on the monitor of, for example, a personal computer (PC), a game console or the like, and thus use as a pointing device has been realized.

A head mounted display is an image display device that presents a three-dimensional image to a user wearing the device. Generally, the head mounted display is used in a state of being mounted to cover the visual range of a user. For this reason, a user wearing the head mounted display is shielded from external images. When the head mounted display is used as a display device of an image of a moving picture, a game or the like, it is difficult for a user to visually recognize an input device such as a controller.

Therefore, the capability of using a head mounted display as a substitute for a pointing device by detecting the eyesight direction of a user wearing the display leads to convenience.

It could therefore be helpful to provide a technique of detecting the eyesight direction of a user wearing a head mounted display.

SUMMARY

We provide a head mounted display used in a state of being mounted on a user's head. The head mounted display includes a convex lens disposed at a position facing the user's cornea when the head mounted display is mounted; a plurality of infrared light sources, disposed in the periphery of the convex lens that emit infrared light toward the user's cornea; a camera that captures an image including the user's cornea in a subject; and a housing that houses the convex lens, the infrared light sources, and the camera. When the periphery of the convex lens is equally divided into four regions of a first region which is a region on the outer corner of the eye of the user, a second region which is a region on the inner corner of the eye, a third region which is a region on the top of the head, and a fourth region which is a region on the jaw, the plurality of infrared light sources are respectively disposed in any of the first region and the second region.

A lens holding unit that holds the convex lens may be further included. The plurality of infrared light sources may be included in the lens holding unit.

An output unit that outputs an image captured by the camera to an eyesight direction detection unit that detects an eyesight direction of the user may be further included. The housing may house the output unit.

Meanwhile, any combinations of the aforementioned components, and implementation thereof in the form of methods, devices, systems, computer programs, data structures, recording mediums, and the like are part of this disclosure.

It is thus possible to provide a technique of detecting the eyesight direction of a user wearing a head mounted display.

REFERENCE SIGNS LIST

1: image system, 100: head mounted display, 103: infrared light source, 105: bright spot, 108: image display element, 112: hot mirror, 114: convex lens, 116: camera, 118: output unit, 130: image display system, 150: housing, 152: lens holding unit, 160: mounting fixture, 170: headphone, 200: image reproducing device, 230: eyesight direction detection unit

DETAILED DESCRIPTION

Figure 1:
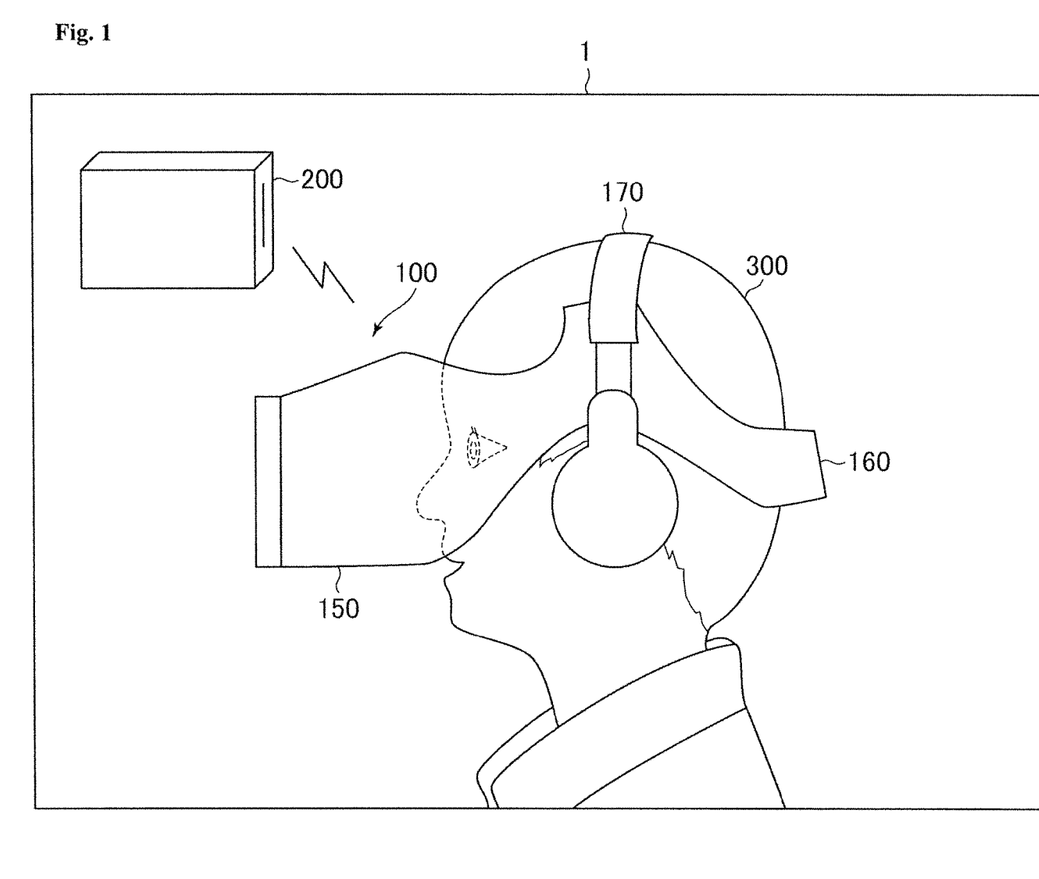
FIG. 1 is a diagram schematically illustrating a general view of an image system according to an example.

FIG. 1 is a diagram schematically illustrating a general view of an image system 1 according to an example. The image system 1 according to the example includes a head mounted display 100 and an image reproducing device 200. As shown in FIG. 1, the head mounted display 100 is used in a state of being mounted on the head of a user 300.

The image reproducing device 200 generates an image displayed by the head mounted display 100. Although not limited, as an example, the image reproducing device 200 is a device capable of reproducing an image of a stationary game console, a portable game console, a PC, a tablet, a smartphone, a phablet, a video player, a television or the like. The image reproducing device 200 connects to the head mounted display 100 in a wireless or wired manner. In an example shown in FIG. 1, the image reproducing device 200 wirelessly connects to the head mounted display 100. Wireless connection of the image reproducing device 200 to the head mounted display 100 can be realized using, for example, a wireless communication technique such as known Wi-Fi (Registered Trademark) or Bluetooth (Registered Trademark). Although not limited, as an example, the transmission of an image between the head mounted display 100 and the image reproducing device 200 is executed according to the standard of Miracast (Trademark), WiGig (Trademark), WHDI (Trademark), or the like.

Meanwhile, FIG. 1 illustrates an example when the head mounted display 100 and the image reproducing device 200 are different devices. However, the image reproducing device 200 may be built into the head mounted display 100.

The head mounted display 100 includes a housing 150, a mounting fixture 160, and a headphone 170. The housing 150 houses an image display system such as an image display element to present an image to the user 300, or a wireless transmission module such as a Wi-Fi module or a Bluetooth (Registered Trademark) module which is not shown. The mounting fixture 160 mounts the head mounted display 100 on the head of the user 300. The mounting fixture 160 can be realized by, for example, a belt, an elastic band or the like. When the user 300 mounts the head mounted display 100 using the mounting fixture 160, the housing 150 is disposed at a position where the eyes of the user 300 are covered. For this reason, when the user 300 mounts the head mounted display 100, the visual range of the user 300 is shielded by the housing 150.

The headphone 170 outputs a voice of an image reproduced by the image reproducing device 200. The headphone 170 may not be fixed to the head mounted display 100. Even in a state where the user 300 mounts the head mounted display 100 using the mounting fixture 160, the user can freely attach and detach the headphone 170.

Figure 2:
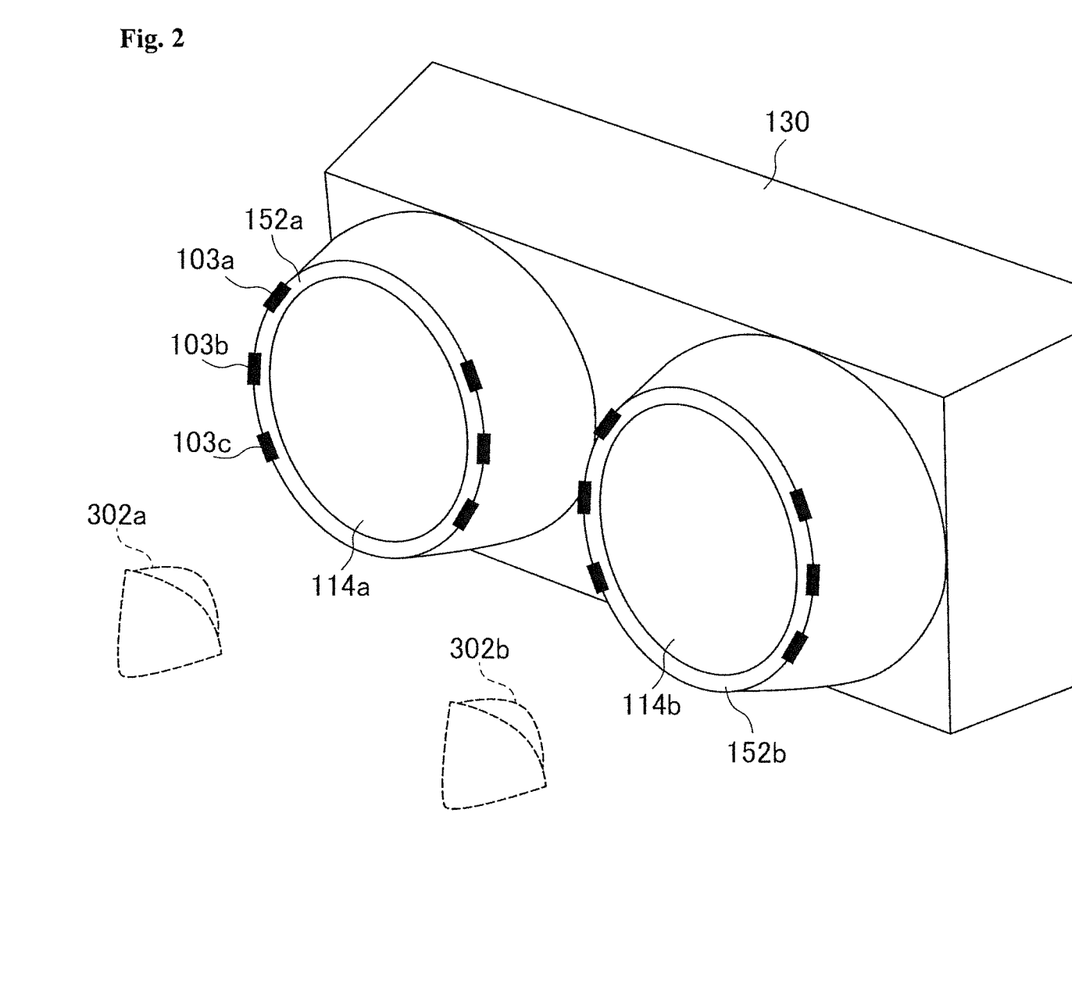
FIG. 2 is a perspective view schematically illustrating a general view of an image display system of a head mounted display according to the example.

FIG. 2 is a perspective view schematically illustrating a general view of an image display system 130 of the head mounted display 100 according to the example. More specifically, FIG. 2 is a diagram illustrating a region facing a cornea 302 of the user 300 in the housing 150 according to the example when the head mounted display 100 is mounted.

As shown in FIG. 2, a left-eye convex lens 114a is located at a position facing a cornea 302a of the left eye of the user 300 when the user 300 mounts the head mounted display 100. Similarly, a right-eye convex lens 114b is located at a position facing a cornea 302b of the right eye of the user 300 when the user 300 mounts the head mounted display 100. The left-eye convex lens 114a and the right-eye convex lens 114b are grasped by a left-eye lens holding unit 152a and a right-eye lens holding unit 152b, respectively.

Hereinafter, except for when the left-eye convex lens 114a and the right-eye convex lens 114b are particularly distinguished from each other, these convex lenses are simply described as the "convex lens 114." Similarly, except for when the cornea 302a of the left eye of the user 300 and the cornea 302b of the right eye of the user 300 are particularly distinguished from each other, these corneas are simply described as the "cornea 302." Similarly, except for when the left-eye lens holding unit 152a and the right-eye lens holding unit 152b are particularly distinguished from each other, the lens holding units are described as the "lens holding unit 152."

The lens holding unit 152 includes a plurality of infrared light sources 103. To avoid becoming complicated, in FIG. 2, reference numerals and signs are assigned to only a first infrared light source 103a, a second infrared light source 103b, and a third infrared light source 103c (hereinafter, except for when these infrared light sources are particularly distinguished from each other, they are described as the "infrared light source 103"), but the same shapes as those assigned the reference numerals and signs in the drawing indicate the infrared light source 103. In the example shown in FIG. 2, six infrared light sources 103 are included in the left-eye lens holding unit 152a. Similarly, six infrared light sources 103 are also included in the right-eye lens holding unit 152b. In this manner, the infrared light sources 103 are disposed in the lens holding unit 152 that grasps the convex lens 114 without being directly disposed in the convex lens 114, and thus the installation of the infrared light sources 103 is facilitated. Generally, the lens holding unit 152 is formed of a resin or the like, and the reason is because processing of installing the infrared light source 103 is more easily performed than that of the convex lens 114 formed of glass or the like.

As described above, the lens holding unit 152 is a member that grasps the convex lens 114. Therefore, the infrared light sources 103 included in the lens holding unit 152 are disposed in the periphery of the convex lens 114. Meanwhile, the details of the arrangement position of the infrared light sources 103 will be described later.

Figure 3:
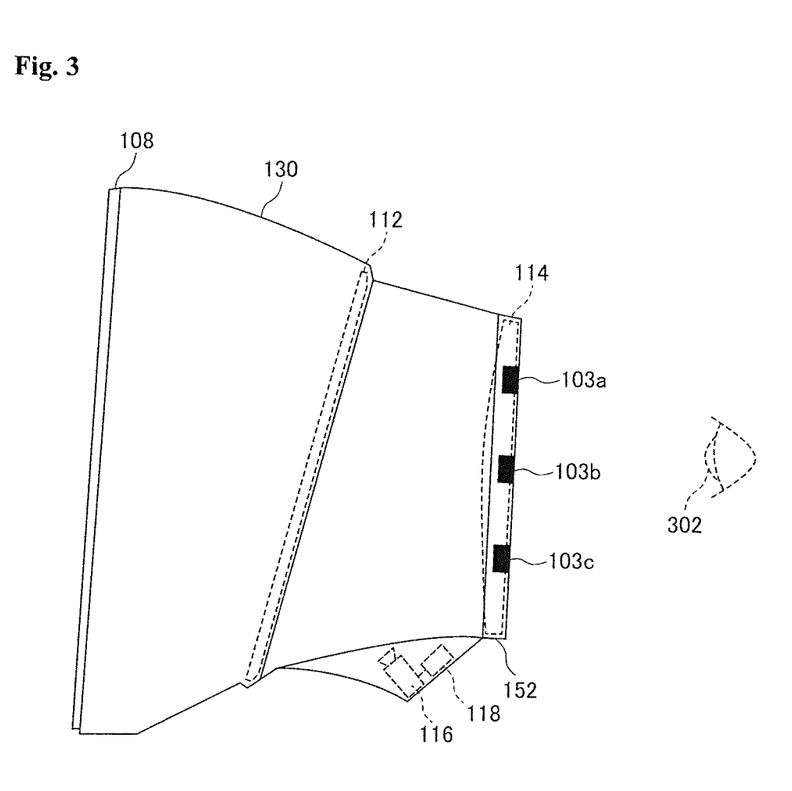
FIG. 3 is a diagram schematically illustrating an optical configuration of an image display system housed by a housing according to the example.

FIG. 3 is a diagram schematically illustrating an optical configuration of the image display system 130 housed by the housing 150 according to the example, and is a diagram when the housing 150 shown in FIG. 2 is seen from the lateral side on the left eye side. The image display system 130 includes the infrared light source 103, an image display element 108, a hot mirror 112, the convex lens 114, a camera 116, and an output unit 118.

The infrared light source 103 is a light source capable of emitting light of a near-infrared (approximately 700 nm to 2,500 nm) wavelength band. The near-infrared light is light of a wavelength band of non-visible light which is not able to be generally observed with a naked eye of the user 300.

The image display element 108 displays an image for presentation to the user 300. The image displayed by the image display element 108 is generated by a graphic processing unit (GPU), not shown, within the image reproducing device 200. The image display element 108 can be realized using, for example, a known liquid crystal display (LCD), an organic electroluminescent display (Organic EL Display) or the like.

When the user 300 mounts the head mounted display 100, the hot mirror 112 is disposed between the image display element 108 and the cornea 302 of the user 300. The hot mirror 112 has a property of transmitting visible light generated by the image display element 108, but reflecting near-infrared light.

The convex lens 114 is disposed on the opposite side to the image display element 108 with respect to the hot mirror 112. In other words, when the user 300 mounts the head mounted display 100, the convex lens 114 is disposed between the hot mirror 112 and the cornea 302 of the user 300. That is, when the head mounted display 100 is mounted to the user 300, the convex lens 114 is disposed at a position facing the cornea 302 of the user 300.

The convex lens 114 condenses image display light that passes through the hot mirror 112. For this reason, the convex lens 114 functions as an image enlargement unit that enlarges an image generated by the image display element 108 and presents the enlarged image to the user 300. Meanwhile, for convenience of description, only one convex lens 114 is shown in FIG. 2, but the convex lens 114 may be a lens group configured by combining various lenses, and may be configured such that one lens has a curvature and the other lens is a planar one-sided convex lens.

The plurality of infrared light sources 103 are disposed in the periphery of the convex lens 114. Each of the infrared light sources 103 emits infrared light toward the cornea 302 of the user 300.

Although not shown, the image display system 130 of the head mounted display 100 according to the example includes two image display elements 108, and can generate an image for presentation to the right eye of the user 300 and an image for presentation to the left eye independently of each other. For this reason, the head mounted display 100 according to the example can present a parallax image for the right eye and a parallax image for the left eye, respectively, to the right eye and the left eye of the user 300. Thereby, the head mounted display 100 according to the example can present a stereoscopic image having a sense of depth to the user 300.

As described above, the hot mirror 112 transmits visible light, and reflects near-infrared light. Therefore, image light emitted by the image display element 108 passes through the hot mirror 112 and reaches the cornea 302 of the user 300. In addition, infrared light emitted from the infrared light source 103 and reflected from the reflection region inside the convex lens 114 reaches the cornea 302 of the user 300.

The infrared light reaching the cornea 302 of the user 300 is reflected from the cornea 302 of the user 300, and directed to the direction of the convex lens 114 again. This infrared light passes through the convex lens 114 and is reflected from the hot mirror 112. The camera 116 includes a filter that shields visible light and captures near-infrared light reflected from the hot mirror 112. That is, the camera 116 is a near-infrared camera that captures near-infrared light emitted from the infrared light source 103 and is reflected from the cornea of the user 300.

The output unit 118 outputs an image captured by the camera 116 to an eyesight direction detection unit that detects the eyesight direction of the user 300. Specifically, the output unit 118 transmits the image captured by the camera 116 to the image reproducing device 200. Although the eyesight direction detection unit will be described later, this detection unit is realized by an eyesight detection program executed by the central processing unit (CPU) of the image reproducing device 200. Meanwhile, when the head mounted display 100 has a computing resource of a CPU, a memory or the like, the CPU of the head mounted display 100 may execute a program to realize the eyesight direction detection unit.

Although a detailed description will be given later, in the image captured by the camera 116, a bright spot caused by the near-infrared light reflected by the cornea 302 of the user 300 and an image of the eye including the cornea 302 of the user 300 observed at a near-infrared wavelength band are captured.

As stated above, a configuration to present an image to the left eye of the user 300 in the image display system 130 according to the example has been mainly described, but a configuration to present an image to the right eye of the user 300 is the same as the above.

Next, the arrangement positions of the infrared light sources 103 according to the example will be described.

Figure 4A:
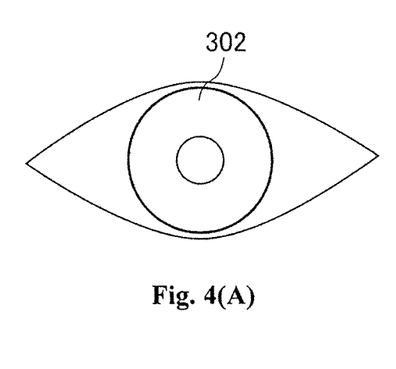
FIGS. 4(A) and 4(B) are diagrams schematically illustrating a relationship between the size of a user's eye and the degree of exposure of the cornea.
Figure 4B:
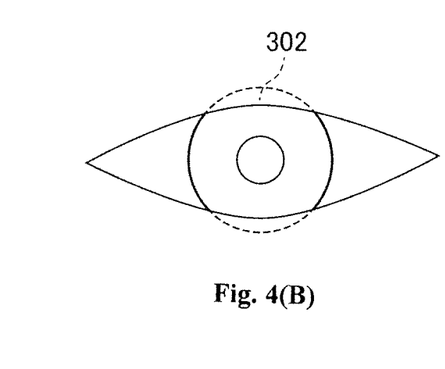

FIGS. 4(A) and 4(B) are diagrams schematically illustrating a relationship between the size of the eye of the user 300 and the degree of exposure of the cornea 302. More specifically, FIG. 4(A) is a diagram illustrating visual performance of the cornea 302 of the user 300 having a large eye, and FIG. 4(B) is a diagram illustrating visual performance of the cornea 302 of the user 300 having a small eye.

As shown in FIG. 4(A), when the eye of the user 300 is large, the cornea 302 of the user 300 can be seen as a whole from the outside. On the other hand, as shown in FIG. 4(B), when the eye of the user 300 is small, a portion of the cornea 302 of the user 300 may not be seen from the outside due to being shielded by the user's eyelid or the like. Generally, the eye of the user 300 has a long shape in a lateral direction (horizontal direction) when the user 300 stands upright. Therefore, when a portion of the cornea 302 of the user 300 is shielded by the user's eyelid or the like, the portion is considered to be at least any one of the upper region and the lower region of the cornea 302.

Figure 5:
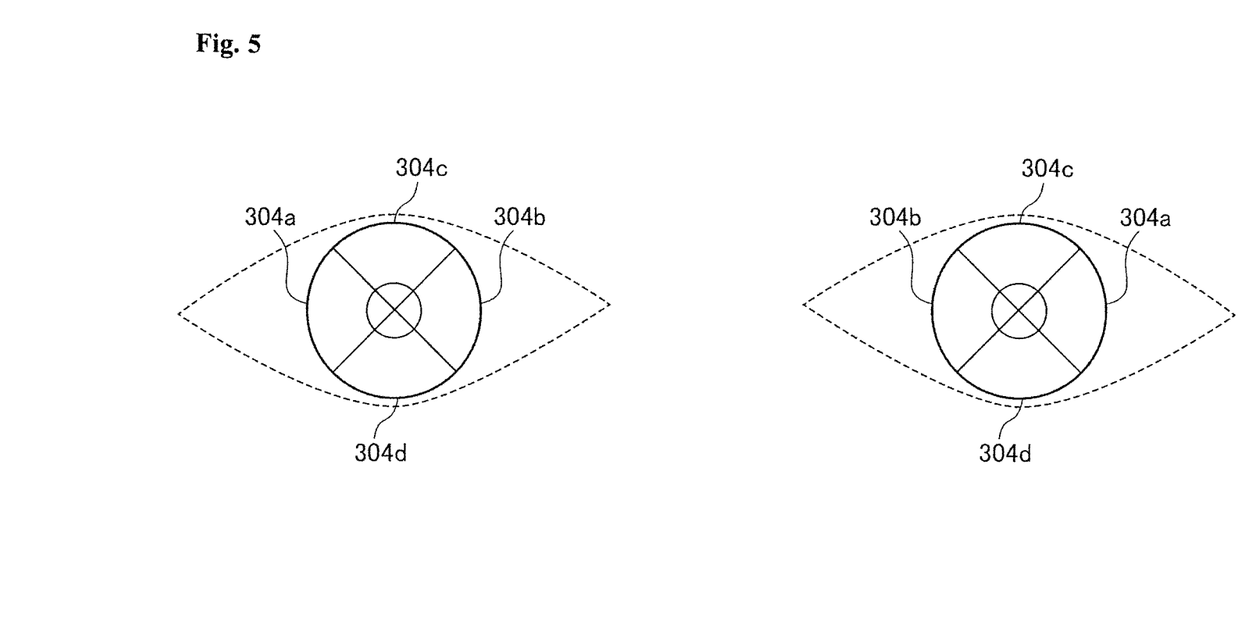
FIG. 5 is a diagram illustrating partial regions on a circumferential portion.

FIG. 5 is a diagram illustrating partial regions on the circumferential portion, and is a diagram illustrating when the eye of the user 300 is seen from the front of the user 300. Generally, the human cornea has a circular shape and the edge portion thereof is circumferential. As shown in FIG. 5, by dividing the circumference into quarters, a region on the outer corner of the eye is set to a first region 304a, a region on the inner corner of the eye is set to a second region 304b, a region on the top of the head is set to a third region 304c, and a region on the jaw is set to a fourth region 304d. In this case, regions in which the eye of the user 300 is small and a portion of the cornea 302 is not seen from the outside due to being shielded by the user's eyelid or the like can refer to the third region 304c and the fourth region 304d. The first region 304a and the second region 304b refer to regions not likely to be shielded by the eyelid or the like.

Figure 6A:
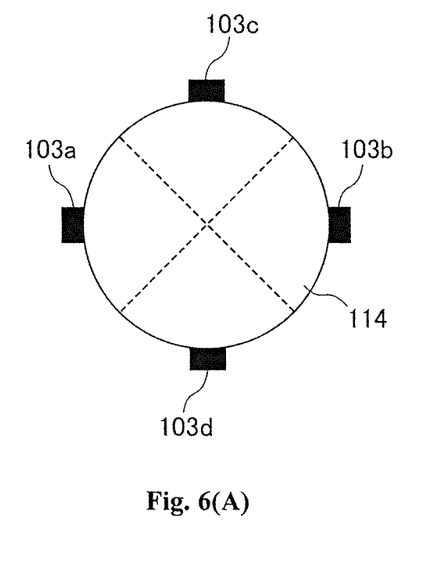
FIGS. 6(A) and 6(B) are diagrams illustrating the relationship between arrangement positions of infrared light sources according to a comparative example of the example and bright spots of infrared light reflected from the cornea of a user.
Figure 6B:
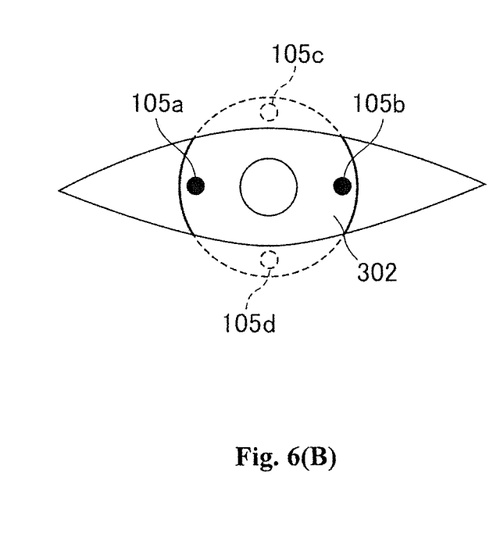

FIGS. 6(A) and 6(B) are diagrams illustrating a relationship between arrangement positions of the infrared light sources 103 according to a comparative example and bright spots of infrared light reflected from the cornea 302 of the user 300. More specifically, FIG. 6(A) is a schematic diagram illustrating arrangement positions of the infrared light sources 103 according to the comparative example, and FIG. 6(B) is a schematic diagram illustrating bright spots of infrared light emitted from each of the infrared light sources 103 shown in FIG. 6(A) and is reflected from the cornea 302 of the user 300.

As described above, the convex lens 114 is disposed at a position facing the cornea 302 of the user 300 when the user 300 mounts the head mounted display 100. Therefore, hereinafter, positions corresponding to the first region 304a, the second region 304b, the third region 304c, and the fourth region 304d which are located in the periphery of the cornea 302 of the user 300 around the convex lens 114 are also similarly described as the first region 304a, the second region 304b, the third region 304c, and the fourth region 304d.

In the example shown in FIG. 6(A), four infrared light sources 103 of the first infrared light source 103a, the second infrared light source 103b, the third infrared light source 103c, and the fourth infrared light source 103d are disposed in the periphery of the convex lens 114. The first infrared light source 103a, the second infrared light source 103b, the third infrared light source 103c, and the fourth infrared light source 103d are disposed in the first region 304a, the second region 304b, the third region 304c, and the fourth region 304d, respectively, located in the periphery of the convex lens 114.

As shown in FIG. 6(B), infrared light emitted from the first infrared light source 103a and the second infrared light source 103b disposed in the first region 304a and the second region 304b, respectively, reaches the cornea 302 of the user 300. However, infrared light emitted from the third infrared light source 103c and the fourth infrared light source 103d disposed in the third region 304c and the fourth region 304d, respectively, does not reach the cornea 302 due to being shielded by the eyelid of the user 300.

Generally, infrared light reaching the cornea 302 of the user 300 is specularly reflected from the cornea 302 and thus changed to an intensive bright spot. On the other hand, infrared light reaching the skin of the user 300 is diffusely reflected from the skin, and thus subject to weak reflection as compared to the reflection from the cornea 302. As described later, the bright spot derived from infrared light emitted from the infrared light source 103 is used as a reference to detect the eyesight direction of the user 300.

Therefore, it is preferable that the infrared light is strongly reflected from the cornea 302 of the user 300.

Consequently, in the head mounted display 100 according to the example, the infrared light sources 103 are disposed in the first region 304a and the second region 304b in the convex lens 114.

Figure 7A:
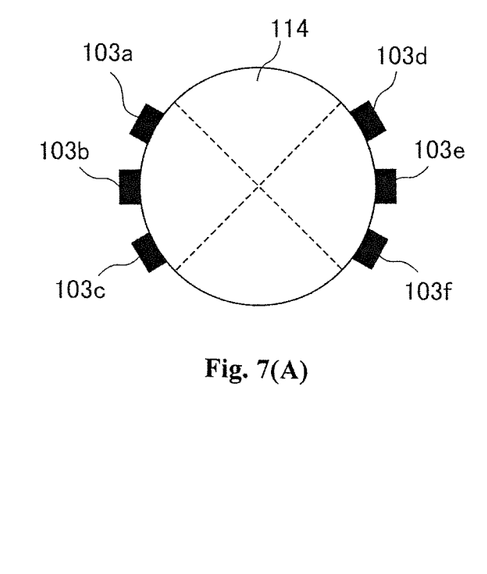
FIGS. 7(A) and 7(B) are diagrams illustrating a relationship between arrangement positions of infrared light sources according to the example and bright spots of infrared light reflected from the cornea of a user.
Figure 7B:
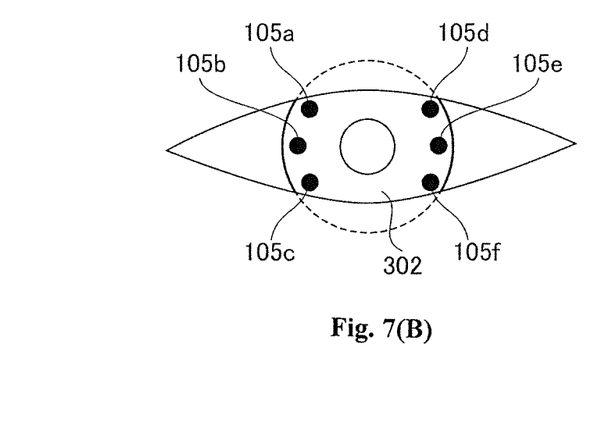

FIGS. 7(A) and 7(B) are diagrams illustrating the relationship between arrangement positions of the infrared light sources 103 according to the example and bright spots of infrared light reflected from the cornea 302 of the user 300. More specifically, FIG. 7(A) is a schematic diagram illustrating arrangement positions of the infrared light sources 103 according to the example, and FIG. 7(B) is a schematic diagram illustrating bright spots of the infrared light which is emitted from the infrared light sources 103 shown in FIG. 7(A) and is reflected from the cornea 302 of the user 300, and is a diagram illustrating an example of an image captured by the above-described camera 116.

As shown in FIG. 7(A), the infrared light sources 103 according to the example are disposed in any of the first region and the second region located in the periphery of the convex lens 114. In other words, the infrared light sources 103 according to the example are disposed on the lateral side (transverse side or horizontal edge side) of the convex lens 114. Generally, since the eye of the user 300 has a horizontally-long elliptical shape, the first region 304a and the second region 304b in the cornea 302 of the user 300 are regions not likely to be shielded by the user's eyelid or the like. Therefore, the infrared light sources 103 are disposed on the lateral side of the convex lens 114, thereby allowing bright spots derived from the infrared light to be generated on the cornea 302 of the user 300, as shown in FIG. 7(B). Since more bright spots serving as a reference to detect the eyesight direction can be generated on the cornea 302 of the user 300, it is possible to improve the robustness of the detection of the eyesight direction.

Next, the detection of the eyesight direction according to the example will be described.

Figure 8:
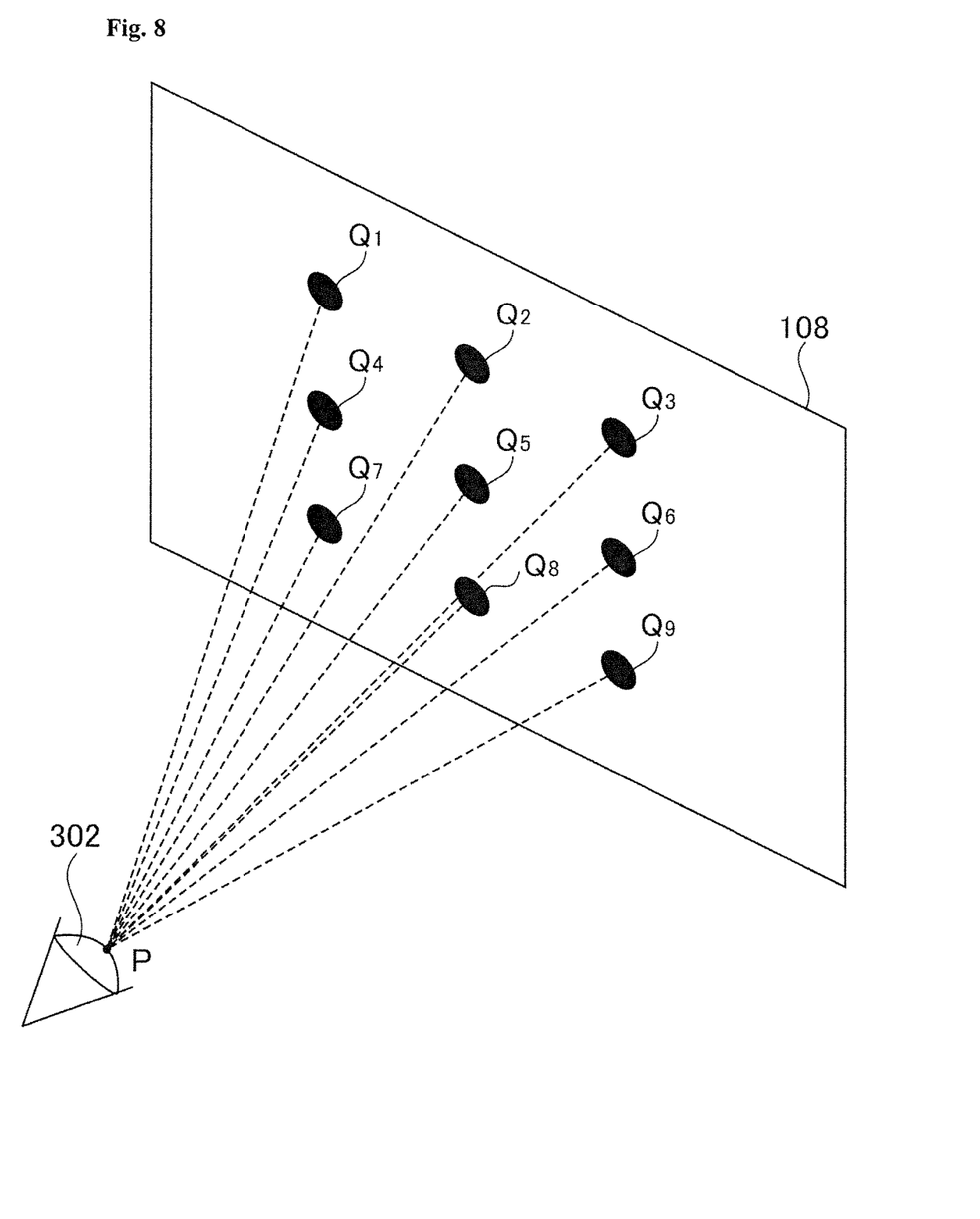
FIG. 8 is a diagram illustrating calibration to detect an eyesight direction according to the example.

FIG. 8 is a diagram illustrating calibration to detect the eyesight direction according to the example. The eyesight direction of the user 300 is realized by the eyesight direction detection unit, not shown, within the image reproducing device 200 analyzing an image captured by the camera 116 and output to the image reproducing device 200 by the output unit 118.

The image reproducing device 200 generates nine points of points $Q_1$ to $Q_9$ as shown in FIG. 8, and displays these points on the image display element 108 of the head mounted display 100. The image reproducing device 200 causes the user 300 to keep observation on these points in order from the point $Q_1$ to the point $Q_9$. In this case, the user 300 is required to keep observation on each point only by the motion of the eyeballs without moving the user's neck. The camera 116 captures an image including the cornea 302 of the user 300 when the user 300 keeps observation on nine points of the points $Q_1$ to $Q_9$.

Figure 9:
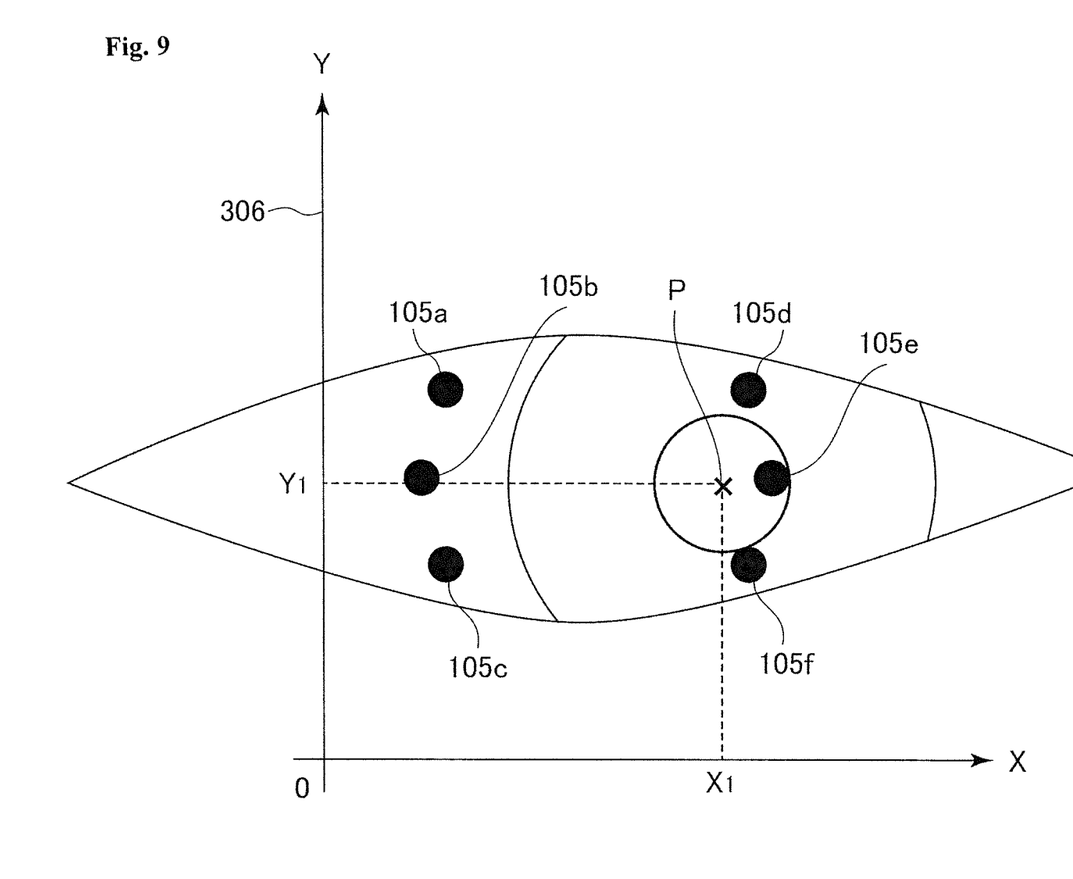
FIG. 9 is a diagram illustrating position coordinates of the cornea of a user.

FIG. 9 is a diagram illustrating position coordinates of the cornea 302 of the user 300. The eyesight direction detection unit within the image reproducing device 200 analyzes an image captured by the camera 116 and detects bright spots 105 derived from infrared light. When the user 300 keeps observation on each point only by the motion of the eyeballs, it is considered that, even when the user keeps observation on any of the points, the positions of the bright spots 105 do not move. Consequently, the eyesight direction detection unit sets a two-dimensional coordinate system 306 in an image captured by the camera 116, on the basis of the detected bright spots 105.

In addition, the eyesight direction detection unit detects the center P of the cornea 302 of the user 300 by analyzing the image captured by the camera 116. This can be realized by using already-known image processing such as, for example, Hough transformation or edge extraction processing. Thereby, the eyesight direction detection unit can acquire the coordinates of the center P of the cornea 302 of the user 300 in the two-dimensional coordinate system 306 which is set.

In FIG. 8, the coordinates of the point $Q_1$ to the point $Q_9$ in the two-dimensional coordinate system set in a display screen displayed by the image display element 108 are set to $Q_1(x_1, y_1)^T, Q_2(x_2, y_2)^T \ldots, Q_9(x_9, x_9)^T$, respectively. Each of the coordinates is, for example, the number of a pixel located on the center of each point. In addition, the centers P of the cornea 302 of the user 300 when the user 300 keeps observation on the point $Q_1$ to the point $Q_9$ are set to the points $P_1$ to $P_9$, respectively. In this case, the coordinates of the points $P_1$ to $P_9$ in the two-dimensional coordinate system 306 are set to $P_1(X_1, Y_1)^T, P_2(X_2, Y_2)^T, \ldots, P_9(Z_9, Y_9)^T$. Meanwhile, T indicates the transposition of a vector or a matrix.

Now, a matrix M having a size of 2×2 is defined as Expression (1).

$$M = \begin{pmatrix} m_{11} & m_{12} \\ m_{21} & m_{22} \end{pmatrix} \quad (1)$$

In this case, when the matrix M satisfies Expression (2), the matrix M becomes a matrix for projecting the eyesight direction of the user 300 onto an image surface which is displayed by the image display element 108.

$$P_N = MQ_N (N=1, \ldots, 9) \quad (2)$$

When Expression (2) is specifically written, Expression (3) is established.

$$\begin{pmatrix} x_1 & x_2 & \ldots & x_9 \\ y_1 & y_2 & \ldots & y_9 \end{pmatrix} = \begin{pmatrix} m_{11} & m_{12} \\ m_{21} & m_{22} \end{pmatrix} \begin{pmatrix} X_1 & X_2 & \ldots & X_9 \\ Y_1 & Y_2 & \ldots & Y_9 \end{pmatrix} \quad (3)$$

When Expression (3) is deformed, Expression (4) is obtained.

$$\begin{pmatrix} x_1 \\ x_2 \\ \vdots \\ x_9 \\ y_1 \\ y_2 \\ \vdots \\ y_9 \end{pmatrix} = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix} \begin{pmatrix} m_{11} \\ m_{12} \\ m_{21} \\ m_{22} \end{pmatrix} \quad (4)$$

When the following expression is set, Expression (5) is obtained.

$$y = \begin{pmatrix} x_1 \\ x_2 \\ \vdots \\ x_9 \\ y_1 \\ y_2 \\ \vdots \\ y_9 \end{pmatrix}, A = \begin{pmatrix} X_1 & Y_1 & 0 & 0 \\ X_2 & Y_2 & 0 & 0 \\ \vdots & \vdots & \vdots & \vdots \\ X_9 & Y_9 & 0 & 0 \\ 0 & 0 & X_1 & Y_1 \\ 0 & 0 & X_2 & Y_2 \\ \vdots & \vdots & \vdots & \vdots \\ 0 & 0 & X_9 & Y_9 \end{pmatrix}, x = \begin{pmatrix} m_{11} \\ m_{12} \\ m_{21} \\ m_{22} \end{pmatrix} \quad (5)$$

$$y = Ax$$

In Expression (5), the elements of a vector y are already known as the coordinates of the points $Q_1$ to $Q_9$ displayed on the image display element 108 by the eyesight direction detection unit. In addition, the elements of a matrix A can be acquired as the coordinates of the peak P of the cornea 302 of the user 300. Therefore, the eyesight direction detection unit can acquire the vector y and the matrix A. Meanwhile, a vector x which is a vector obtained by arranging the elements of the transformation matrix M is unknown. Therefore, when the vector y and the matrix A are already known, a problem of estimating the matrix M becomes a problem of obtaining the unknown vector x.

In Expression (5), when the number of expressions (that is, the number of points Q presented to the user 300 when the eyesight direction detection unit 230 performs calibration) is larger than the number of unknowns (that is, the number of elements of the vector x is 4), a priority determination problem occurs. In the example shown in Expression (5), the number of expressions is nine, which leads to a priority determination problem.

An error vector between the vector y and a vector Ax is set to a vector e. That is, the relation of e=y-Ax is established. In this case, in the meaning of minimizing a square sum of the elements of the vector e, an optimum vector $x_{opt}$ is obtained by Expression (6).

$$x_{opt} = (A^T A)^{-1} A^T y \quad (6)$$

"−1" indicates an inverse matrix.

The eyesight direction detection unit constitutes the matrix M of Expression (1) by using the elements of the obtained vector $x_{opt}$. Thereby, the eyesight direction detection unit uses the matrix M and the coordinates of the peak P of the cornea 302 of the user 300, and thus can estimate where on the moving image surface displayed by the image display element 108 the user 300 keeps observation according to Expression (2).

As described above, according to the head mounted display 100 according to the example, it is possible to provide a technique to detect the eyesight direction of a user wearing the head mounted display.

Particularly, the head mounted display 100 according to the example is disposed so that infrared light emitted by the infrared light source 103 reliably reaches the cornea 302 of the user 300. Therefore, it is possible to cause a reference point to determine the position coordinates of the cornea 302 of the user 300 to reliably appear on the cornea 302. As a result, it is possible to improve the robustness of the detection of the eyesight direction of the user 300.

As stated above, the description has been described on the basis of an example. The example has been described for exemplary purposes only, and it can be readily understood by those skilled in the art that various modifications may be made by a combination of each of these components or processes, which are also encompassed in the scope of this disclosure.

In the above, we have been described an example in which three infrared light sources 103 are disposed in each of the first region 304a and the second region 304b located around the convex lens 114. However, the infrared light sources 103 may be disposed in any of the first region 304a and the second region 304b located around the convex lens 114, and the number of infrared light sources is not limited to three. Hereinafter, a modification example of the arrangement of the infrared light sources 103 will be described.

FIGS. 10(A) to 10(F) are diagrams schematically illustrating arrangement positions of the infrared light sources 103 in the head mounted display 100 according to the modification example.

Figure 10A:
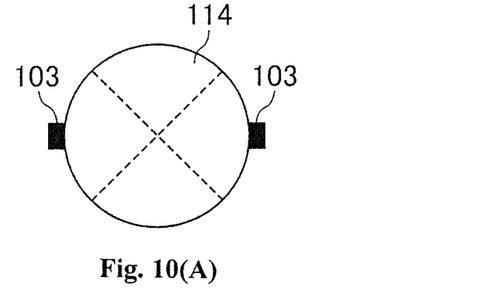
FIGS. 10(A) to 10(F) are diagrams schematically illustrating arrangement positions of infrared light sources in a head mounted display according to a modified example.
Figure 10B:
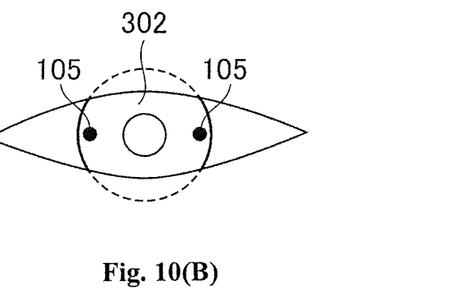

FIG. 10(A) is a diagram illustrating the arrangement of the infrared light sources 103 according to a first modification example, and FIG. 10(B) is a diagram illustrating positions of the bright spots 105 in the arrangement shown in FIG. 10(A). As shown in FIG. 10(A), the infrared light sources 103 according to the first modification example are disposed, one by one, at the central position of each of the first region 304a and the second region 304b located around the convex lens 114. As a result, as shown in FIG. 10(B), the bright spots 105 appear, one by one, in each of the first region 304a and the second region 304b in the cornea 302 of the user 300.

Figure 10C:
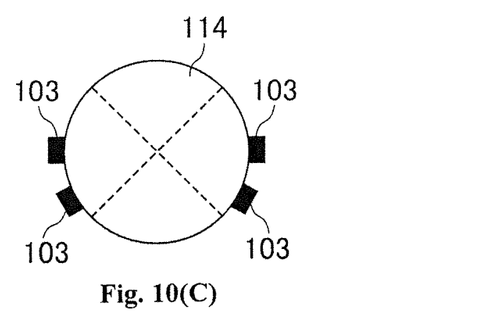
Figure 10D:
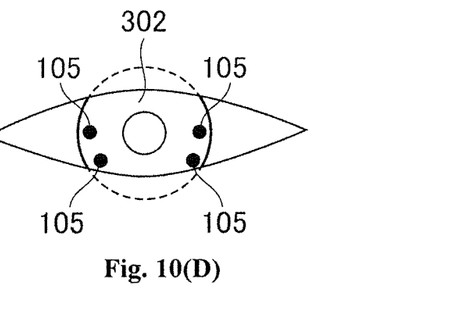

FIG. 10(C) is a diagram illustrating the arrangement of the infrared light sources 103 according to a second modification example, and FIG. 10(D) is a diagram illustrating positions of the bright spots 105 in the arrangement shown in FIG. 10(C). As shown in FIG. 10(C), the infrared light sources 103 according to the second modification example are disposed, one by one, at the central position and the lower portion of each of the first region 304a and the second region 304b located around the convex lens 114. As a result, as shown in FIG. 10(D), two bright spots 105 appear in each of the first region 304a and the second region 304b in the cornea 302 of the user 300.

Figure 10E:
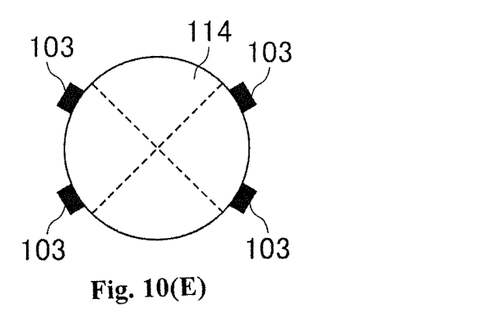
Figure 10F:
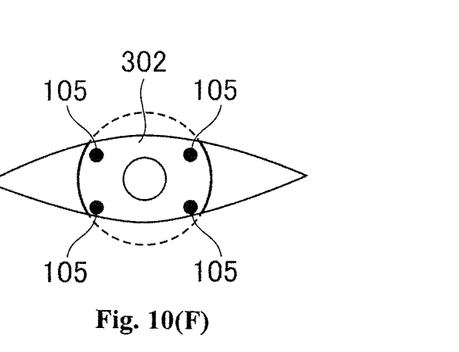

FIG. 10(E) is a diagram illustrating the arrangement of the infrared light sources 103 according to a third modification example, and FIG. 10(F) is a diagram illustrating positions of the bright spots 105 in the arrangement shown in FIG. 10(E). As shown in FIG. 10(E), the infrared light sources 103 according to the third modification example are disposed, one by one, in the upper portion and the lower portion with the central position of each of the first region 304a and the second region 304b which are located around the convex lens 114 interposed therebetween. As a result, as shown in FIG. 10(F), two bright spots 105 also appear in each of the first region 304a and the second region 304b in the cornea 302 of the user 300.

In the examples shown in FIGS. 10(A) to 10(F), any of the infrared light sources 103 are disposed in any of the first region 304a and the second region 304b located in the periphery of the convex lens 114. Thereby, it is possible to cause bright spots derived from infrared light emitted from the infrared light sources 103 to appear on the cornea 302 of the user 300 without being shielded by the eyelid or the like of the user 300.

The invention claimed is:

1. An eyesight detection device comprising:
   a lens to be disposed at a position facing a user's cornea when the device is used by the user;

a plurality of infrared light sources disposed in a periphery of the lens that emit infrared light toward the user's cornea; and a camera that captures an image including the user's cornea;

wherein, when the periphery of the lens is equally divided into four regions of a first region corresponding to the outer corner side of the eye of the user, a second region corresponding to the inner corner side of the eye, a third region corresponding to the top side of the head, and a fourth region corresponding to the jaw side, the plurality of infrared light sources are disposed in the first region and the second region wherein the plurality of infrared light sources are disposed asymmetrically with respect to an axis extending through a center of the first region and a center of the second region.

2. The eyesight detection device according to claim 1, further comprising a lens holding unit that holds the lens, wherein the plurality of infrared light sources are included in the lens holding unit.

3. The eyesight detection device according to claim 1, further comprising:

a hot mirror that reflects the infrared light;

an output unit that outputs an image captured by the camera to an eyesight direction detection unit that detects an eyesight direction of the user; and a housing that houses the lens, the infrared light sources, the hot mirror, the output unit, and the camera, wherein the lens is disposed between the hot mirror and the user's cornea.

* * * * *